(12) United States Patent
Ikeda et al.

(10) Patent No.: US 9,322,353 B2
(45) Date of Patent: Apr. 26, 2016

(54) ENGINE CONTROL APPARATUS AND HYBRID VEHICLE INCLUDING THEREOF

(75) Inventors: Kiyoto Ikeda, Yamato (JP); Ritsuo Satou, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 398 days.

(21) Appl. No.: 13/202,649

(22) PCT Filed: Feb. 26, 2010

(86) PCT No.: PCT/IB2010/000403
§ 371 (c)(1),
(2), (4) Date: Aug. 22, 2011

(87) PCT Pub. No.: WO2010/103360
PCT Pub. Date: Sep. 16, 2010

(65) Prior Publication Data
US 2011/0307135 A1    Dec. 15, 2011

(30) Foreign Application Priority Data
Mar. 9, 2009   (JP) .................................. 2009-054735

(51) Int. Cl.
*B60W 20/00*   (2006.01)
*F02D 41/06*   (2006.01)
(Continued)

(52) U.S. Cl.
CPC .............. *F02D 41/06* (2013.01); *B60W 10/06* (2013.01); *B60W 10/08* (2013.01); *B60W 30/194* (2013.01); *F01L 1/34* (2013.01); *B60L 2240/445* (2013.01);
(Continued)

(58) Field of Classification Search
USPC ............................... 701/22, 99–103, 108–109
See application file for complete search history.

(56) References Cited

U.S. PATENT DOCUMENTS 5,924,395 A * 7/1999 Moriya et al. ............. 123/90.15
6,026,921 A * 2/2000 Aoyama et al. ............ 180/65.25
(Continued)

FOREIGN PATENT DOCUMENTS

CN          1940255 A      4/2007
CN        101196144 A      6/2008
(Continued)

OTHER PUBLICATIONS

A Written Opinion of the International Search Authority for International Application No. PCT/IB2010/000403, dated May 21, 2010, mailed Jun. 2, 2010.
(Continued)

*Primary Examiner* — John Q Nguyen
*Assistant Examiner* — Edward Torchinsky
(74) *Attorney, Agent, or Firm* — Global IP Counselors, LLP (57) ABSTRACT

An engine control apparatus for a hybrid vehicle is provided with a conversion angle detecting device, an angle determining device, an engine load calculating device and an engine control device. The conversion angle detecting device detects a rotational phase of a cam with respect to a crankshaft as a detected conversion angle of a variable valve operating mechanism of an engine. The angle determining device determines if the detected conversion angle is different from a starting conversion angle when the engine is started. The engine load calculating device calculates a requested load to be imposed on the engine based on the detected conversion angle if the detected conversion angle is different from to the starting conversion angle at a time the engine is started. The engine control device controls the engine in accordance with the requested engine load that was calculated.

13 Claims, 7 Drawing Sheets

(51) Int. Cl.
*B60W 10/06* (2006.01)
*B60W 10/08* (2006.01)
*B60W 30/194* (2012.01)
*F01L 1/34* (2006.01)

(52) U.S. Cl.
CPC .......... *B60W 20/00* (2013.01); *B60W 2510/068* (2013.01); *B60W 2510/0685* (2013.01); *F01L 2820/041* (2013.01); *F01L 2820/042* (2013.01); *Y02T 10/6286* (2013.01)

(56) References Cited

U.S. PATENT DOCUMENTS

| | | | |
|---|---|---|---|
| 7,520,260 B2 | 4/2009 | Nakamura et al. | |
| 7,753,032 B2* | 7/2010 | Iihoshi et al. | 123/508 |
| 7,806,211 B2 | 10/2010 | Sugimoto | |
| 2001/0006061 A1* | 7/2001 | Shimada et al. | 123/495 |
| 2002/0139329 A1* | 10/2002 | Machida | 123/90.16 |
| 2004/0187566 A1* | 9/2004 | Nisimura | 73/117.3 |
| 2004/0237510 A1* | 12/2004 | Kusada et al. | 60/285 |
| 2005/0092272 A1* | 5/2005 | Shindou | 123/90.16 |
| 2005/0166877 A1* | 8/2005 | Suga et al. | 123/90.17 |
| 2006/0081207 A1* | 4/2006 | Nakamura | 123/179.3 |
| 2006/0231052 A1* | 10/2006 | Yamanaka | 123/90.17 |
| 2007/0101961 A1* | 5/2007 | Teraya | 123/90.17 |
| 2007/0235007 A1 | 10/2007 | Yasui et al. | |
| 2008/0189022 A1* | 8/2008 | Watanabe et al. | 701/101 |
| 2008/0288155 A1* | 11/2008 | Watanabe et al. | 701/102 |

FOREIGN PATENT DOCUMENTS

| | | |
|---|---|---|
| EP | 1 099 843 | 5/2001 |
| EP | 1 182 074 | 2/2002 |
| EP | 1 482 155 | 12/2004 |
| EP | 1577511 A2 | 9/2005 |
| JP | 2003-293826 A | 10/2003 |
| JP | 2007-278249 A | 10/2007 |
| JP | 2008-121498 A | 5/2008 |
| JP | 2008-273423 A | 11/2008 |

OTHER PUBLICATIONS

An English translation of the Chinese Office Action for the corresponding Chinese Application No. 201080010964.4, issued on Jul. 24, 2013.
An English translation of the Japanese Notification of Reason for Rejection of corresponding Japanese Application No. 2009-054735, issued on Apr. 9, 2013.

* cited by examiner

ENGINE CONTROL APPARATUS AND HYBRID VEHICLE INCLUDING THEREOF

CROSS-REFERENCE TO RELATED APPLICATIONS

This application is a U.S. National stage of International Application No. PCT/IB2010/000403, filed Feb. 26, 2010, which claims priority to Japanese Patent Application No. 2009-054735, filed on Mar. 9, 2009. The entire disclosure of Japanese Patent Application No. 2009-054735 is hereby incorporated herein by reference.

BACKGROUND

1. Field of the Invention

The present invention generally relates to an engine control apparatus having a variable valve operating mechanism and a hybrid vehicle equipped with such an engine control apparatus. More specifically, the present invention relates to an engine control apparatus that reduces an amount of HC emissions produced in a hybrid vehicle.

2. Background Information

Japanese Laid-Open Patent Publication No. 2005-320911 discloses a technology in which the output of an engine of a hybrid vehicle is limited in accordance with an activation state of a catalytic converter provided downstream of the engine when hybrid vehicle is started. According to this publication, when the catalytic converter is in a non-activated state, a torque of the engine is set to zero and the vehicle is started into motion using output from a motor.

SUMMARY

It has been discovered that if the vehicle is started into motion using the motor without starting the engine when the catalytic converter is not in an active state, then combustion gas from the engine will not flow through the catalytic converter and the catalytic converter will not reach an activated state. Then, if a situation occurs in which the engine must be started, the engine will be started under conditions in which the catalytic converter cannot effectively clean (remove) HC emissions from the exhaust gas of the engine.

In a vehicle equipped with an engine having a variable valve operating mechanism capable of varying a valve timing, as the output of the engine will increase, the amount of HC exhausted from the engine will also ultimately increase if the engine is started while a conversion angle of the variable valve operating mechanism that is not suitable for starting.

The present invention was conceived in order to resolve the problems described above. One object of the invention is to provide an engine control apparatus that reduces the amount of HC exhausted from an engine having a variable valve operating mechanism when the engine is started. Another object of the present invention is to provide a hybrid vehicle in which the amount of HC exhausted from an engine having a variable valve operating mechanism is reduced when the engine is started.

In view of the state of the known technology, one aspect of the present invention, an engine control apparatus is provided for a hybrid vehicle that comprises a conversion angle detecting device, an angle determining device, an engine load calculating device and an engine control device. The conversion angle detecting device detects a rotational phase of a cam with respect to a crankshaft as a detected conversion angle of a variable valve operating mechanism of an engine. The angle determining device determines if the detected conversion angle is equal to a starting conversion angle when the engine is started. The engine load calculating device calculates a requested load to be imposed on the engine based on the detected conversion angle if the detected conversion angle is different from the starting conversion angle at a time the engine is started. The engine control device controls the engine in accordance with the requested engine load that was calculated.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
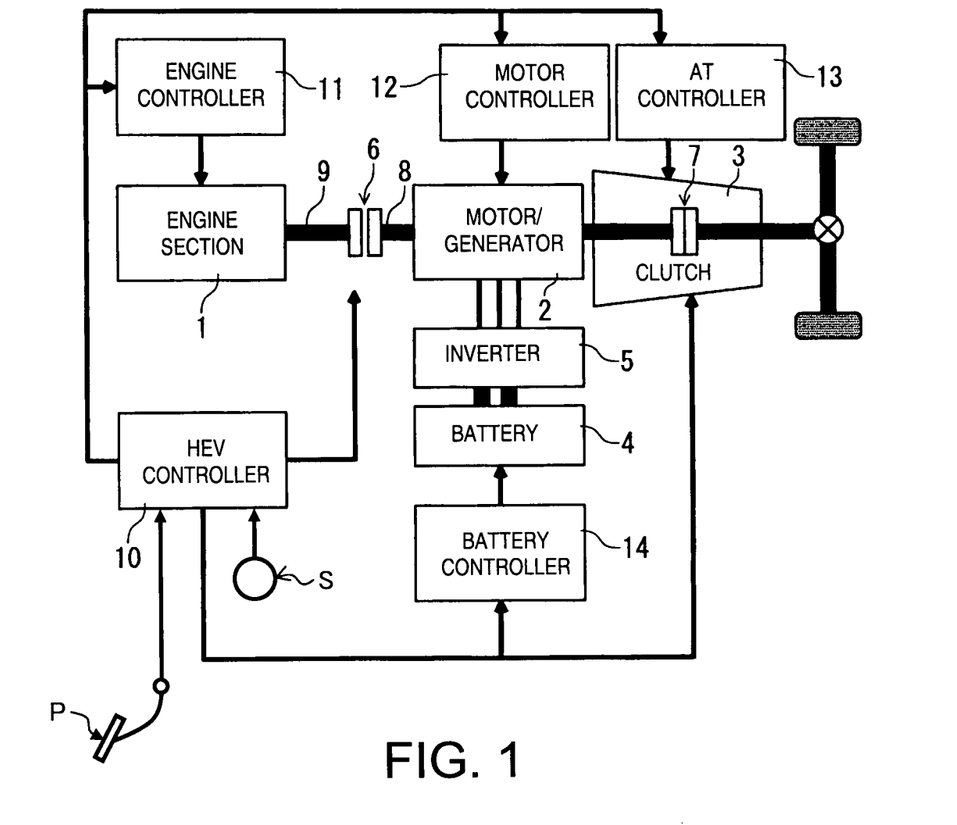
FIG. 1 is a schematic block diagram of a hybrid vehicle according to an embodiment.

Referring initially to FIG. 1, a schematic block diagram of a portion of a hybrid vehicle is illustrated in accordance with a first embodiment. The hybrid vehicle includes, among other things, an internal combustion engine 1, a motor/generator 2, a transmission 3 and a battery 4. An inverter 5 is disposed between the motor/generator 2 and the battery 4. A clutch 6 is arranged between a shaft 8 of the motor/generator 2 and a shaft 9 of the engine 1. A clutch 7 is provided in the transmission 3. The hybrid vehicle also has an HEV controller 10, an engine controller 11, a motor controller 12, an AT controller 13 and a battery controller 14. The controllers 11 to 14 are connected together with a CAN communication line such that they can exchange information.

Figure 2:
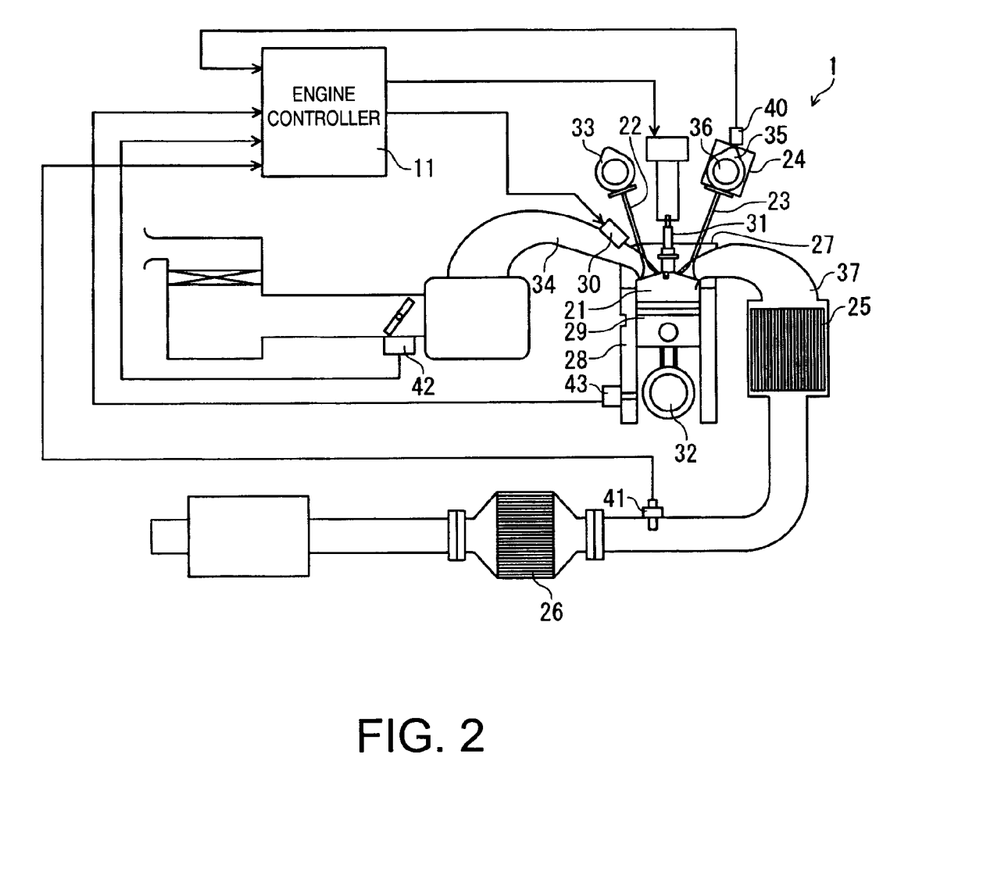
FIG. 2 is a schematic view of an engine according to the embodiment illustrated in FIG. 1.

The internal combustion engine 1 will now be explained in detail with reference to FIG. 2. FIG. 2 is a schematic view of one cylinder of the internal combustion engine 1. In this illustrated embodiment, the internal combustion engine 1 is a multi-cylinder engine for the hybrid vehicle. However, only one cylinder will be illustrated in detail for the sake of brevity. A combustion chamber 12 for each cylinder is formed by a top surface of the piston 11, a cylinder wall surface and a bottom surface of the cylinder head 20. The engine 1 includes a combustion chamber 21, an intake valve 22, an exhaust valve 23, a variable valve operating mechanism 24, a manifold catalytic converter 25 and an underfloor catalytic converter 26. The combustion chamber 21 for each cylinder is defined by a cylinder head 27, a cylinder block 28 and a piston 29. A fuel injection valve 30 is arranged to inject fuel into the combustion chamber 21 of each cylinder and a spark plug 31 is arranged to ignite the fuel and induce combustion in the combustion chamber 21 of each cylinder.

The intake valve 22 opens and closes in accordance with rotation of a cam 33 arranged to move in response to rotation of a crankshaft 32. When the intake valve 22 opens during the intake stroke, air that has passed through the intake passage 34 and fuel injected from the fuel injection valve 30 are supplied to the inside of the combustion chamber 21.

The exhaust valve 23 opens and closes in accordance with rotation of a cam 35 arranged to move in response to rotation of the crankshaft 32. When the exhaust valve 23 opens during the exhaust stroke, exhaust gas is discharged from the combustion chamber 21 to an exhaust passage 37. The valve timing of the exhaust valve 23 is varied by the variable valve operating mechanism 24.

Figure 7:
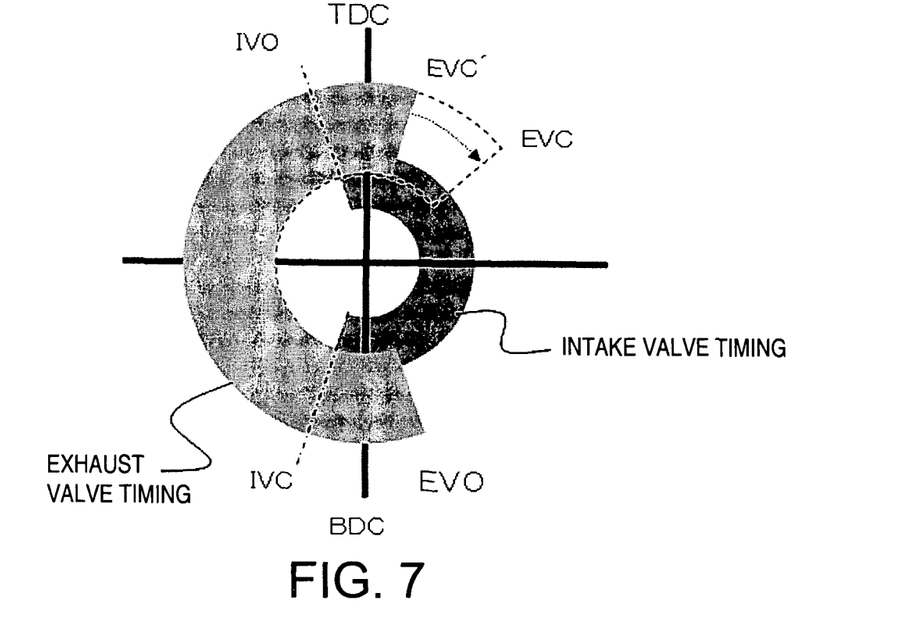
FIG. 7 is a valve timing diagram for explaining a valve timing of an exhaust valve according to the embodiment illustrated in FIGS. 1 to 3.

The variable valve operating mechanism 24 is configured to vary a rotational phase of the cam 35 of the exhaust valve 23 with respect to the crankshaft 32. The variable valve operating mechanism 24 is hydraulically operated by hydraulic pressure supplied from a hydraulic oil pump and serves to change a relative rotational position of a camshaft 36 of the exhaust valve 23 with respect to the crankshaft 32. In this way, the variable valve operating mechanism 24 can vary the rotational phase of the cam 35 of the exhaust valve 23 with respect to the crankshaft 32. Rotation of the crankshaft 32 is detected by a crank angle sensor 43 and the rotational phase of the cam 35 is detected by a phase sensor 40. The phase sensor 40 constitutes one example of a conversion angle detecting device that detects a rotational phase of the cam 35 with respect to the crankshaft 32 as a detected conversion angle of the variable valve operating mechanism 24. The rotational phase of the cam 35 is hereinafter referred to as the VTC conversion angle (conversion angle). If the intake valve timing of the intake valve 22 of the engine 1 according to this embodiment is a fixed value (i.e., the intake valve opening timing IVO and the intake valve close timing IVC are both fixed), then the exhaust valve timing of the exhaust valve 23 will be as shown in FIG. 7. That is, the exhaust valve closing timing is set to a most advanced position (EVC') when the vehicle is in a pre-engine-start state (default state), and the exhaust valve close timing is set to a retarded position (EVC) that is more retarded than the position EVC' when the engine is cold started. Thus, during a cold start, the exhaust valve close timing is set such that the amount of valve overlap is larger.

The manifold catalytic converter 25 is provided in the exhaust passage 37 adjacent to the combustion chamber 21. A capacity of the manifold catalytic converter 25 is smaller than a capacity of the underfloor catalytic converter 26. Consequently, the manifold catalytic converter 25 heats up rapidly and when the engine is started and quickly enters an activated state. As a result, the manifold catalytic converter 25 cleans HC and other contaminants from the exhaust gas while the underfloor catalytic converter 26 is becoming activated and serves to reduce the amount of exhaust-borne HC discharged to the outside of the vehicle.

The underfloor catalytic converter 26 is arranged in the exhaust passage 37 downstream from the manifold catalytic converter 25 and serves to clean HC and other contaminants from exhaust gas. The underfloor catalytic converter 26 is a three-way catalytic converter. A three-way catalytic converter serves to clean exhaust gas by simultaneously oxidizing HC and CO and deoxidizing (reducing) NOx. An exhaust gas temperature sensor (activation state detecting device) 41 is provided immediately upstream of the underfloor catalyst 26 and serves to detect an activation state of the underfloor catalytic converter 26.

Returning to FIG. 1, the motor generator 2 is arranged between the engine 1 and the transmission 3, with the clutch 6 being arranged between the shaft 8 of the motor/generator 2 and the shaft 9 of the engine 1. A rotation transmission state between the engine 1 and the motor/generator 2 is changed by changing a connection (engagement) state of the clutch 6.

The motor/generator 2 is configured to function as a motor when by receiving electric power from the battery 4 through the inverter 5 and as a generator by being rotated by the automatic transmission 3 or the engine 1. The transmission 3 is a step-shifting type automatic transmission configured to shift gears automatically in response to a vehicle speed and/or an accelerator position. The clutch 7 of the transmission 3 is configured such that a rotation transmission state between the transmission 3 and a drive wheel is changed by changing a connection (engagement) state of the clutch 7. The transmission 3 is not limited to a step-shifting type automatic transmission. For example, a continuously variable transmission can also be used as the transmission 3.

The battery 4 serves to supply electric power to the motor/generator 2 through the inverter 5. The battery 4 is also charged with electric power generated by the motor generator 2.

The engine controller 11 controls the engine torque in accordance with a target engine torque command. The engine controller 11 also controls variable valve operating mechanism 24.

The motor controller 12 controls the motor torque in accordance with a target motor/generator torque command. The motor controller 12 also controls the generated electric power in accordance with an operating condition and an SOC of the battery 4.

The AT controller 13 shifts the transmission 3 based on such factors as the vehicle speed and a signal indicating an accelerator position.

The HEV controller 10 controls the entire hybrid vehicle. Based on signs received through the CAN communication line, the HEV controller 10 controls the connection states of the clutches 6 and 7 and switches the operating mode of the vehicle (e.g., between an EV mode and an HEY mode). The HEV controller 10 also calculates a requested engine load based on signals from the phase sensor 40, the exhaust gas temperature sensor 41, and a throttle opening degree sensor 42 and outputs the calculated requested engine load information.

Figure 3:
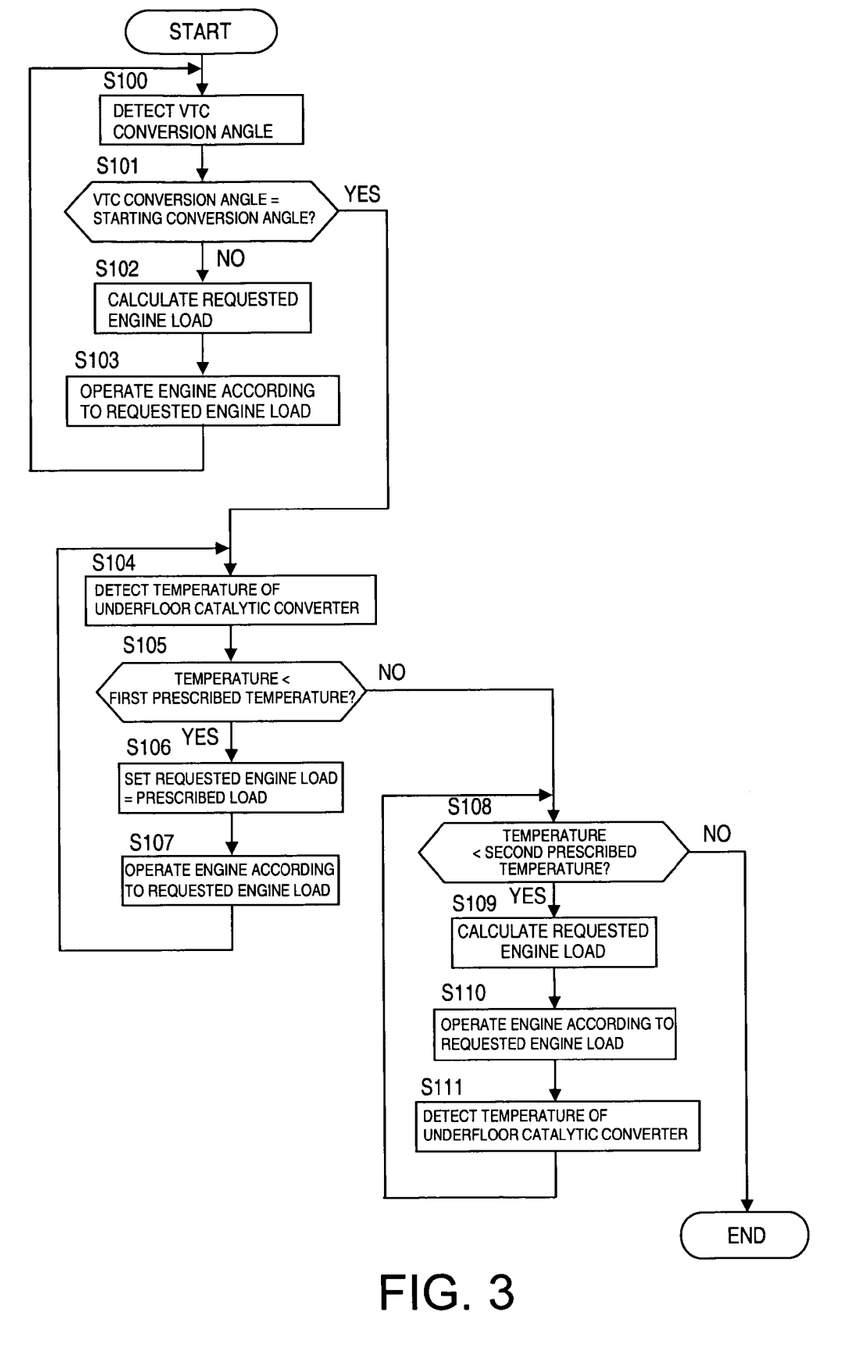
FIG. 3 is a flowchart explaining a start control of the hybrid vehicle according to the embodiment illustrated in FIGS. 1 and 2.

A start control for a hybrid vehicle according to this embodiment will now be explained using the flowchart shown in FIG. 3. This process of the flow chart in FIG. 3 is executed in response to an engine start instruction being issued. The HEV controller 10 issues the engine start instruction upon determining that that a vehicle condition or situation exists in which the engine 1 should be started.

In step S100, if the start engine instruction has been issued, then the HEV controller 10 reads a VTC conversion angle detected by the phase sensor 40.

In step S101, the HEV controller determines if the detected VTC conversion angle is a suitable conversion angle for the start control, i.e., if the detected VTC conversion angle is a starting conversion angle (retarded with respect to a most advanced angle). Step S101 constitutes one example of an angle determining device. If the VTC conversion angle is not equal to a starting conversion angle, in other words, if the VTC conversion angle is different from the starting conversion angle, then the HEV controller 10 proceeds to step S102. If the VTC conversion angle corresponds to a starting conversion angle, then the HEV controller 10 proceeds to step S104.

Figure 4:
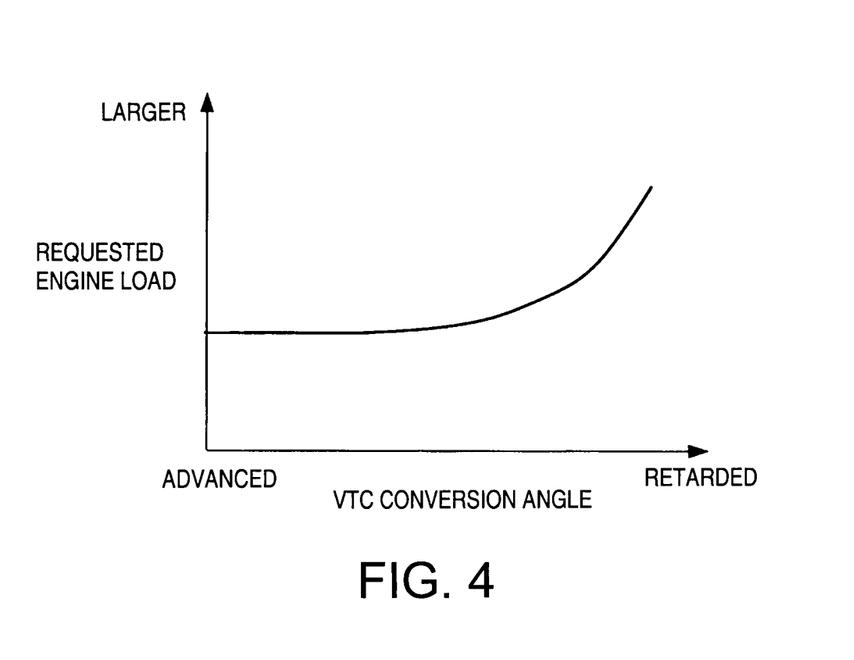
FIG. 4 is a map plotting a relationship of a requested engine load versus a VTC conversion angle.

In step S102, the HEV controller 10 calculates a requested engine load (requested load) based on the detected VTC conversion angle using the map shown in FIG. 4. Step S102 constitutes one example of an engine load calculating device. In this illustrated embodiment, during normal operation when the engine temperature is comparatively high, an exhaust valve close timing of the engine 1 is controlled such that a better fuel efficiency is obtained than during cold starting. Conversely, during cold starting, the exhaust valve close timing is retarded in comparison with normal operation such that the amount of valve overlap is increased. FIG. 4 is a map plotting the requested engine load versus the VTC conversion angle. As shown in FIG. 4, the requested engine load is smaller when the VTC conversion angle is more advanced. That is, the requested engine load decreases when the VTC conversion angle is offset by a large amount from the start conversion angle, i.e., when the amount of valve overlap obtained with the detected VTC conversion angle is smaller than the amount of valve overlap obtained with the start conversion angle. The reason for this relationship is that if the intake valve opening timing is assumed to be constant, then the amount of valve overlap will be smaller when the valve timing is such that the VTC conversion angle of the variable valve operating mechanism 24 provided for the exhaust valve 23 is more advanced. In other words, when the amount of valve overlap decreases, the concentration of HC contained in the exhaust gas discharged from the combustion chamber 21 increases and, therefore, the volume of exhaust gas discharged from the combustion chamber is decreased such that the total amount of HC discharged is suppressed.

The variable valve operating mechanism 24 is controlled such that the VTC conversion angle is set to a most advanced angle when the engine 1 is stopped. After the engine 1 is started, the variable valve operating mechanism 24 is controlled such that the VTC conversion angle is set to a starting conversion angle. However, if a prescribed amount of time elapses before the hydraulic pressure required to change the VTC conversion angle is supplied to the variable valve operating mechanism 24. Also, after the hydraulic pressure required to change the VTC conversion angle to the starting conversion angle is supplied, a prescribed amount of time elapses before the VTC conversion angle actually reaches the starting conversion angle. Therefore, until the VTC conversion angle reaches the starting conversion angle, the requested engine load is decreased in order to decrease the amount of exhaust gas discharged from the combustion chamber 21 and, thereby, reduce the amount of HC discharged. In this way, the volume of exhaust gas is lowered and the total amount of HC discharged is suppressed.

Meanwhile, as the VTC conversion angle draws close to the starting conversion angle, the requested engine load is increased and the amount of exhaust gas discharged from the combustion chamber 21 is increased so as to warm the underfloor catalytic converter 26.

In step S103, the HEV controller 10 operates the engine 1 according to the requested engine load. Also in step S103, the HEV controller 10 also instructs the engine controller 11 to operate the variable valve operating mechanism 24 can vary the rotational phase of the cam 35 of the exhaust valve 23 with respect to the crankshaft 32. Step S103 constitutes one example of an engine control device. As a result, the amount of HC discharged from the combustion chamber 21 is decreased and the amount of HC discharged from the underfloor catalytic converter 26 can be decreased even though the catalytic converter 26 is not in an activated state. Since the engine 1 is started and combustion is continued even though the catalytic converters 25 and 26 are not activated, high-temperature exhaust gas discharged from the combustion chambers flow to the catalytic converters and the converters 25 and 26 can be brought to an activated state in a comparatively short amount of time while suppressing the amount of HC discharged, i.e., a shorter amount of time than if the engine section is not started when the catalytic converter is not activated. Thus, the underfloor catalytic converter 26 can be heated up while the VTC conversion angle approaches the starting conversion angle. Output from the motor/generator 2 is used to supplement the amount by which the output of the engine 1 decreases due to the control.

A requested drive force of the hybrid vehicle is calculated by the HEV controller 10 (e.g., a requested drive force calculating device) based on an accelerator pedal P (e.g., an acceleration intent detecting device) operated by a driver of the vehicle and a vehicle speed sensor S (e.g., a vehicle speed detecting device) provided on the vehicle. The engine 1 and the motor/generator 2 are controlled based on a requested engine load for the engine 1 and a requested motor/generator load for the motor/generator 2, respectively, that are set to satisfy the calculated requested drive force. Supplementing with output from the motor/generator 2 refers to a situation in which the requested engine load for the motor/generator 2 is set to assist with the amount by which the output of the engine 1 is decreased when, for example, a cold start is being executed and the driver is not depressing the accelerator pedal P (i.e., the accelerator is off or the vehicle is in an idling state). The requested engine load for the engine 1 is calculated either calculated by the HEV controller 10 and sent to the engine controller 11, or calculated by the engine controller 11. Thus, either the HEV controller 10 or the engine controller 11 constitutes an example of an engine load calculating device for the illustrated embodiment of FIG. 1. The requested motor/generator load for the motor/generator 2 is calculated either calculated by the HEY controller 10 and sent to the motor controller 12, or calculated by the motor controller 12. Thus, either the HEV controller 10 or the motor controller 12 constitutes an example of a motor/generator load calculating device for the illustrated embodiment of FIG. 1.

Steps S101 to S103 are repeatedly executed until the VTC conversion angle is found to be equal to the starting conversion angle in step S101.

When the VTC conversion angle is found to be equal to the starting conversion angle in step S101, the HEV controller 10 proceeds to step S104 where it reads a temperature of the underfloor catalytic converter 26 detected by the exhaust gas temperature sensor 41.

In step S105, the HEV controller 10 compares the detected temperature of the underfloor catalytic converter 26 to a first prescribed temperature (first activation state). Step S105 constitutes a first activation state determining device. If the temperature of the underfloor catalytic converter 26 is lower than the first prescribed temperature, then the HEV controller 10 proceeds to step S106. If the temperature of the underfloor catalytic converter 26 is equal to or higher than the first prescribed temperature, then the REV controller 10 proceeds to step S108. The first prescribed temperature is a temperature at which activation starts in a portion of the underfloor catalytic converter 26, i.e., a temperature at which the underfloor catalytic converter 26 starts becoming active.

In step S106, the HEV controller 10 sets the requested engine load to a prescribed load. Step S106 constitutes one example of an engine load calculating device. The prescribed load is a comparatively large engine load and is set to be equal to or larger than a requested engine load corresponding to when the VTC conversion angle became equal to the starting conversion angle. When the requested engine load is set to the prescribed load, the amount of heat in the exhaust gas discharged from the combustion chamber 21 increases and the temperature of the underfloor catalytic converter 26 increases due to the heat. As a result, the temperature of the underfloor catalytic converter 26 can be increased quickly to the first prescribed temperature.

In step S107, the engine 1 is operated according to the prescribed load. The HEV controller 10 then returns to step S104 and repeats the control steps explained above. Although the requested engine load is set to a prescribed load in this embodiment, it is also acceptable to set the requested engine load to a requested engine load corresponding to when the VTC conversion angle reaches the starting conversion angle.

In step S108, the HEV controller 10 compares the detected temperature of the underfloor catalytic converter 26 to a second prescribed temperature (second activation state). Step S108 constitutes one example of a second activation state determining device. If the temperature of the underfloor catalytic converter 26 is lower than the second prescribed temperature, then the HEV controller 10 proceeds to step S109. If the temperature of the underfloor catalytic converter 26 is equal to or higher than the second prescribed temperature, then the HEV controller 10 ends the control loop. The second prescribed temperature is a temperature at which the underfloor catalytic converter 26 has finished activating and is in an activated state such that the entire underfloor catalytic converter 26 can function to clean exhaust gas.

Figure 5:
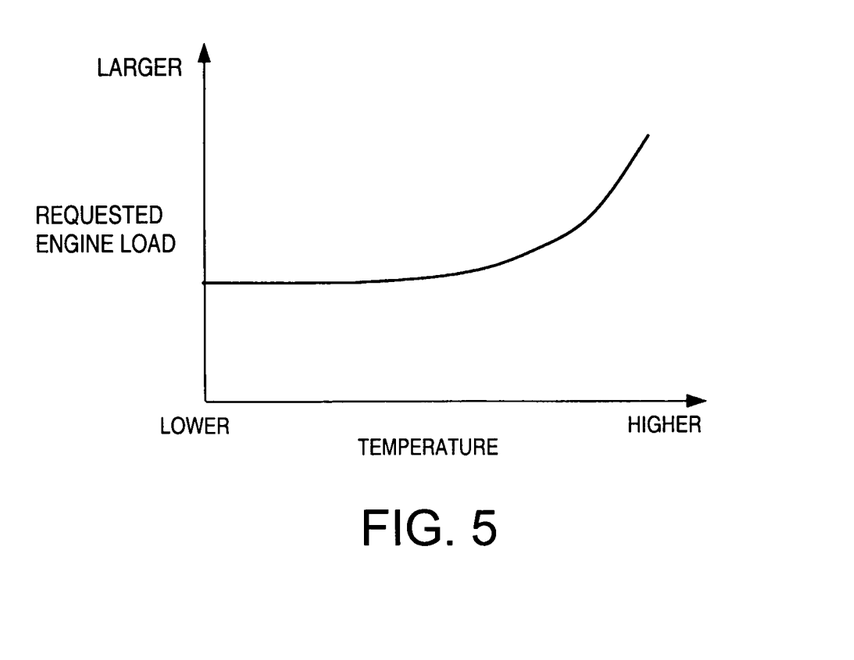
FIG. 5 is a map plotting a relationship of a requested engine load versus a temperature of an underfloor catalytic converter.

In step S109, the HEV controller 10 calculates a required engine load based on the detected a temperature of the underfloor catalytic converter 26 using the map shown in FIG. 5. Step S109 constitutes an engine load calculating device. FIG. 5 is a map plotting the requested engine load versus the temperature of the underfloor catalytic converter 26. As shown in the figure, the requested engine load is smaller when the temperature of the underfloor catalytic converter 26 is lower. When the temperature of the underfloor catalytic converter 26 becomes equal to or higher than the first prescribed temperature and the underfloor catalytic converter 26 starts becoming activated, the requested engine load is decreased so as to decrease the amount of HC discharged from the combustion chamber 21 and promote activation of the underfloor catalytic converter 26.

In step S110, the engine 1 is operated according to the requested engine load. Output from the motor/generator 2 is used to supplement the amount by which the output of the engine 1 decreases due to the control.

In step S111, the HEV controller 10 reads a temperature of the underfloor catalytic converter 26 detected by the exhaust gas temperature sensor 41. The HEV controller 10 then returns to step S108 and repeats the control steps explained above.

If the temperature of the underfloor catalytic converter 26 is found to be equal to or larger than the second prescribed temperature in step S108, then the HEV controller 10 ends the control loop and starts a normal control.

When the temperature of the underfloor catalytic converter 26 reaches or exceeds the second prescribed temperature, the underfloor catalytic converter 26 is in an activated state and can clean the exhaust gas discharged from the combustion chamber 21 even if the requested engine load demanded of the engine 1 has increased. Thus, even if the driver depresses the accelerator pedal by a large amount and the engine load requested of the engine 1 increases, the underfloor catalytic converter 26 can clean the exhaust gas sufficiently while the engine 1 generates a drive force in accordance with the requested engine load. When the state of charge of the battery 4 has declined, the motor/generator 2 can be driven by the engine 1 so as to generate electricity and charge the battery 4.

Figure 6:
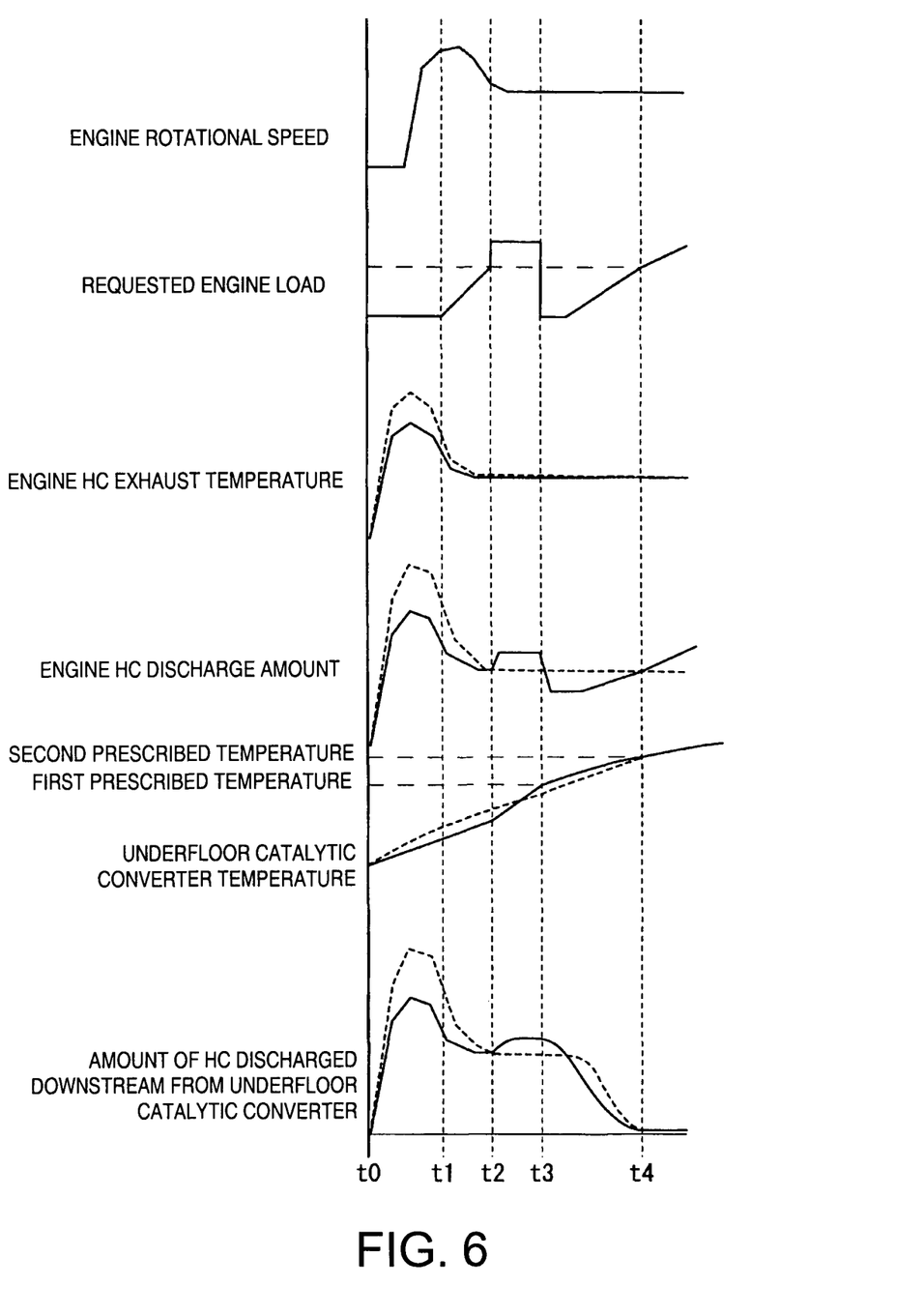
FIG. 6 is a timing chart illustrating what occurs in a hybrid vehicle according to the same embodiment when the engine is started of the hybrid vehicle according to the embodiment illustrated in FIGS. 1 to 3.

The changes that occur in the engine load and other quantities when a hybrid vehicle according to this embodiment is started will now be explained with reference to the time charge shown in FIG. 6. In FIG. 6, the broken-line curves illustrate comparative examples of the engine load and other quantities obtained when this embodiment is not used.

In this explanation, it is assumed that immediately after the hybrid vehicle is started, the underfloor catalytic converter 26 is in a non-activated state and the VTC conversion angle is set to a most advanced value.

At a time t0 of the timing chart of FIG. 6, the hybrid vehicle is started and the HEV controller 10 detects the VTC conversion angle. Immediately after the hybrid vehicle is started, for example, the VTC conversion angle of the variable valve operating mechanism 24 cannot be changed because hydraulic pressure has not been supplied from the hydraulic oil pump. Since the concentration of HC in the exhaust gas discharged from the combustion chamber 21 is high due to the advanced VTC conversion angle, the HEV controller 10 calculates a requested engine load in accordance with the VTC conversion angle and decreases the requested engine load. By operating the engine 1 in accordance with the requested engine load, the amount of HC discharged from the combustion chamber 21 is decreased. As a result, the amount of HC discharged from the underfloor catalytic converter 26 decreases even if the underfloor catalytic converter 26 has not reached an activated state.

At a time t1, the VTC conversion angle becomes changeable and the HEV controller 10 controls the variable valve operating mechanism 24 such that the VTC conversion angle is changed to a starting conversion angle. The HEV controller 10 also increases the requested engine load in accordance with the VTC conversion angle. As a result, the amount of exhaust gas discharged from the combustion chamber 21 increases and the temperature of the underfloor catalytic converter increases quickly.

At a time t2, the VTC conversion angle becomes equal to the starting conversion angle and, if the temperature of the underfloor catalytic converter 26 is lower than the first prescribed temperature, then the HEV controller 10 sets the engine load to be equal to a prescribed load. As a result, the amount of exhaust gas discharged from the engine increases and the amount of heat in the exhaust gas discharged from the combustion chamber 21 increases, thus causing the temperature of the underfloor catalytic converter 26 to increase rapidly.

At a time t3, the temperature of the underfloor catalytic converter 26 reaches the first prescribed temperature. Thus, activation of the underfloor catalytic converter 26 begins and the underfloor catalytic converter 26 starts to clean HC from the exhaust gas. Meanwhile, the HEV controller 10 calculates a requested engine load based on the temperature (activation state) of the underfloor catalytic converter 26. As a result, the requested engine load temporarily decreases and then gradually increases in accordance with the increasing temperature of the underfloor catalytic converter 26. Likewise, the amount of HC discharged from the combustion chamber 21 changes in accordance with the requested engine load. Afterwards, however, the amount of HC discharged from the underfloor catalytic converter 26 decreases as the activation of the underfloor catalytic converter 26 progresses.

At a time t4, the temperature of the underfloor catalytic converter 26 reaches a second prescribed temperature and the HEV 10 starts normal control because the underfloor catalytic converter 26 is in an activated state.

Figure 8:
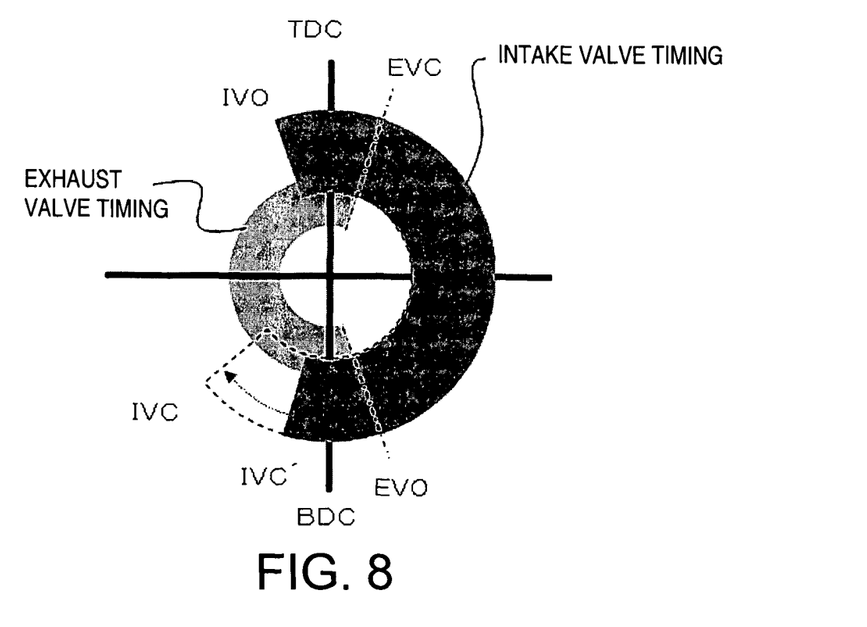
FIG. 8 is a valve timing diagram for explaining a valve timing of an intake valve according to another embodiment.
Figure 9:
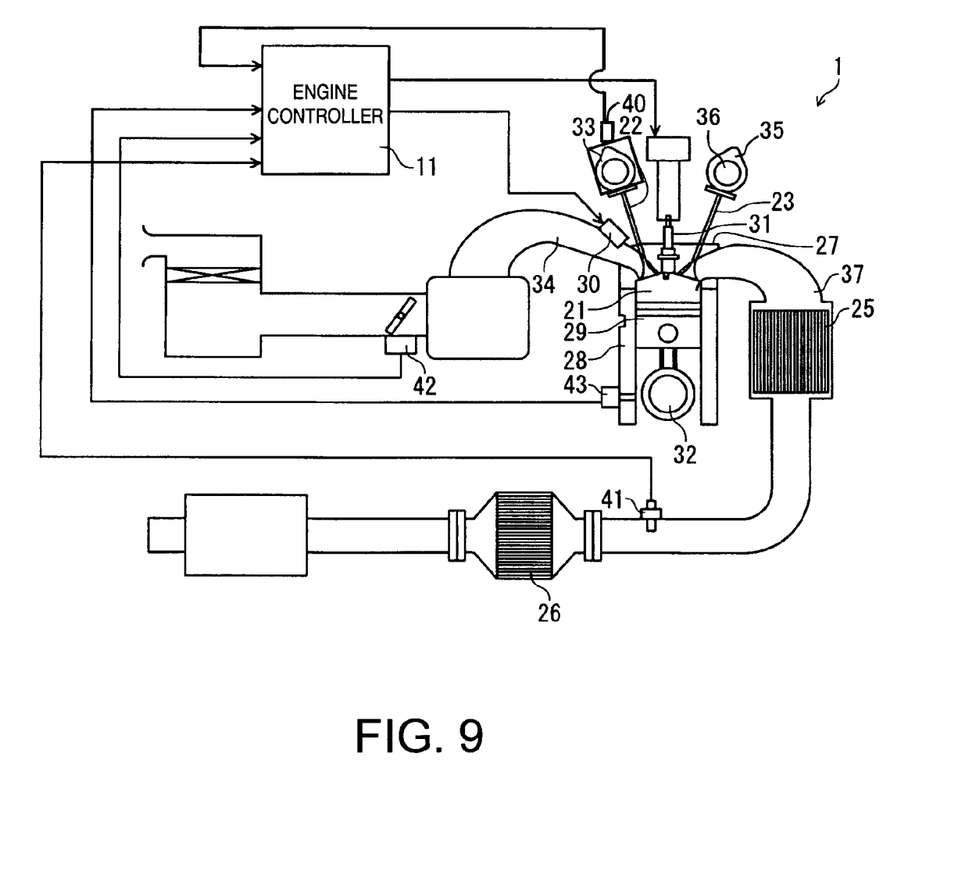
FIG. 9 is a schematic block diagram of a hybrid vehicle according to according to the embodiment illustrated in FIG. 8

Although in this embodiment a variable valve operating mechanism 24 is provided on the exhaust valve 23, it is also acceptable to provide a variable valve operating mechanism on the intake valve 22. If a variable valve operating mechanism is provided on the intake valve 22 as seen in FIG. 9, then in the control explained above (step S102), the requested engine load is decreased when the VTC conversion angle is at a retarded value. As shown in FIG. 8, the intake valve close timing is in a retarded timing before the engine is started during normal operation. During cold starting, the intake valve open timing is set to an advanced timing (IVO) such that the amount of valve overlap is increased. It is also acceptable to provide a variable valve operating mechanism 24 on both the exhaust valve 23 and the intake valve 22.

When a hybrid vehicle having a variable valve operating mechanism 24 is started, the VTC conversion angle of the variable valve operating mechanism 24 is not at a starting conversion angle. If the concentration of HC in the exhaust gas discharged from the combustion chamber 21 is high, then a requested engine load is calculated based on the VTC conversion angle and the engine 1 is operated based on the calculated requested engine load. In particular, if the VTC conversion angle is an advanced angle, then the amount of HC contained in the exhaust gas discharged from the combustion chamber 21 can be reduced and the amount of HC discharged from the underfloor catalytic converter 26 can be decreased by decreasing the requested engine load.

As the VTC conversion angle approaches the starting conversion angle, the requested engine load is increased such that the amount of exhaust discharged from the combustion chamber 21 increases and the amount of heat in the exhaust gas entering the underfloor catalytic converter 26 increases. As a result, the underfloor catalytic converter 26 can be warmed up quickly.

When the temperature of the underfloor catalytic converter 26 is lower than a first prescribed temperature, the amount of heat in the exhaust gas entering the underfloor catalytic converter 26 is increased by setting the engine load to a prescribed load. As a result, the underfloor catalytic converter 26 can be warmed up quickly to a temperature at a portion of the underfloor catalytic converter 26 becomes active and the underfloor catalytic converter 26 can start cleaning exhaust gas.

When the temperature of the underfloor catalytic converter 26 has exceeded the first prescribed temperature and the underfloor catalytic converter 26 has begun to clean the exhaust gas, a requested engine load is calculated based on the temperature of the underfloor catalytic converter 26 and the engine 1 is operated according to the calculated requested engine load. In this way, the amount of HC discharged from the combustion chamber 21 can be reduced and the activation of the underfloor catalytic converter 26 can be promoted.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine control apparatus comprising:
    an engine control device configured to control a rotational phase of a cam with respect to a crankshaft as a conversion angle of a variable valve operating mechanism of an engine during an operation including a starting time of the engine;
    a conversion angle detecting device that detects an actual conversion angle of the variable valve operating mechanism at a starting time of the engine;
    an angle determining device that determines if the actual conversion angle detected at the starting time of the engine is different from a starting conversion angle representing a prescribed conversion angle of the variable valve operating mechanism for starting the engine; and
    an engine load calculating device that calculates a requested engine load to be imposed on the engine based on the actual conversion angle upon the actual conversion angle being determined to be different from the starting conversion angle at the starting time of the engine, and the engine control device being configured to control the conversion angle in accordance with the requested engine load that was calculated at the starting time of the engine upon the actual conversion angle being determined to be different from the starting conversion angle.

2. The engine control apparatus according to claim 1, wherein
    the engine load calculating device further calculates the requested engine load such that the requested engine load becomes smaller as an amount by which the actual conversion angle is offset from the starting conversion angle becomes larger.

3. The engine control apparatus according to claim 1, wherein
    the engine control device sets a conversion angle that achieves a larger amount of valve overlap than a pre-engine start conversion angle that is the actual conversion angle before the engine starting.

4. The engine control apparatus according to claim 3, wherein
    the engine load calculating device further calculates the requested engine load to be imposed on the engine such that the requested engine load becomes smaller as a gap between a valve overlap amount obtained with the actual conversion angle and a valve overlap amount obtained with the starting conversion angle becomes larger.

5. The engine control apparatus according to claim 1, wherein:
    the engine control device sets the starting conversion angle as a conversion angle of an exhaust valve timing that is retarded with respect to a most advanced conversion angle that can be achieved by the valve variable operating mechanism varying the exhaust valve timing.

6. The engine control apparatus according to claim 1, wherein the engine control device sets the starting conversion angle as a conversion angle of an intake valve timing that is retarded with respect to a most advanced conversion angle that can be achieved by the valve variable operating mechanism varying the intake valve timing.

7. The engine control apparatus according to claim 1, further comprising an activation state detecting device configured to detect an activation state of a catalytic converter; and a first activation state determining device configured to determine if a detected activation state of the catalytic converter has reached a first activation state in which at least a portion of the catalytic converter starts to clean the exhaust gas, and the engine load calculating device setting the requested engine load to be imposed on the engine to a load equal to or larger than a requested load that would be imposed on the engine if the actual conversion angle was equal to the starting conversion angle upon determining that the determined activation state has not reached the first activation state.

8. The engine control apparatus according to claim 7, further comprising a second activation state determining device configured to determine if a detected activation state of the catalytic converter has reached a second activation state in which the entire catalytic converter cleans exhaust gas, and the engine load calculating device calculating the requested engine load to be imposed on the engine based on the detected activation state of the catalytic converter upon determining that the activation state has reached the first activation state but has not reached the second activation state.

9. The engine control apparatus according to claim 8, wherein the activation state detecting device determines an activation state by estimating a temperature of the catalytic converter.

10. A hybrid vehicle that includes the engine control apparatus according to claim 1, the hybrid vehicle comprising:

a drive train including an internal combustion engine and a motor/generator that provide a drive force of the vehicle;

an acceleration intent detecting device that detects an intent of a driver to accelerate the vehicle;

a vehicle speed detecting device that detects a vehicle speed of the vehicle;

a requested drive force calculating device configured to calculate a requested drive force of the vehicle based on a detected acceleration intent and a detected vehicle speed;

a motor/generator load calculating device that calculates a requested motor/generator load to be imposed on the motor/generator based on the required drive force that was calculated and the requested engine load that was calculated by the engine load calculating device; and a motor/generator control device that controls the motor/generator based on the requested motor/generator load that was calculated.

11. A hybrid vehicle comprising:

a drive train including an internal combustion engine and a motor/generator that provide a drive force of the vehicle;

a variable valve operating mechanism that varies a valve timing of the engine by adjusting a conversion angle indicating a rotational phase of a cam with respect to a crankshaft;

a requested drive force calculating device that calculates a requested drive force of the vehicle;

a conversion angle detecting device that detects a detected conversion angle of the variable valve operating mechanism;

an angle determining device that determines if the detected conversion angle is different from a starting conversion angle representing a prescribed conversion angle of the variable valve operating mechanism for starting the engine at a starting time of the engine;

an engine load calculating device that calculates a requested engine load to be imposed on the engine;

a motor/generator load calculating device that calculates a requested motor/generator load to be imposed on the motor/generator;

an engine control device that controls the engine in accordance with the requested engine load that was calculated; and a motor/generator control device configured to control the motor/generator based on the requested motor/generator load that was calculated, the engine load calculating device being configured such that upon determining the detected conversion angle detected, at the time of starting the engine, is different from the starting conversion angle, then the requested engine load is calculated by the engine load calculating device to be smaller than a requested load that would be imposed on the engine if the detected conversion angle was equal to the starting conversion angle at the time of starting the engine, the motor/generator load calculating device calculating the requested motor/generator load based on the requested engine load that was calculated and the requested drive force of the vehicle that was calculated.

12. The engine control apparatus according to claim 7, wherein the activation state detecting device determines an activation state by estimating a temperature of the catalytic converter.

13. The engine control apparatus according to claim 1, wherein the engine load calculating device is further configured such that upon determining that the actual conversion angle, at the time of starting the engine, is different from the starting conversion angle, then the requested engine load is calculated by the engine load calculating device to be smaller than a requested load that would be imposed on the engine if the actual conversion angle was equal to the starting conversion angle.

* * * * *